United States Patent
Zelina et al.

(10) Patent No.: US 12,385,642 B2
(45) Date of Patent: Aug. 12, 2025

(54) SEQUENTIAL COMBUSTION GAS TURBINE ENGINE INCLUDING A STEAM SYSTEM FOR INJECTING STEAM TO EACH COMBUSTOR

(71) Applicant: General Electric Company, Schenectady, NY (US)

(72) Inventors: Joseph Zelina, Waynesville, OH (US); Clayton S. Cooper, Loveland, OH (US); Sibtosh Pal, Mason, OH (US); Pradeep Naik, Bengaluru (IN); Sripathi Mohan, Bengaluru (IN); Michael A Benjamin, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/507,877

(22) Filed: Nov. 13, 2023

(65) Prior Publication Data

US 2025/0155124 A1    May 15, 2025

(51) Int. Cl.
*F23R 3/34*      (2006.01)
*F02C 3/30*      (2006.01)
(Continued)

(52) U.S. Cl.
CPC .............. *F23R 3/346* (2013.01); *F02C 3/30* (2013.01); *F02C 6/003* (2013.01); *F02C 9/28* (2013.01);
(Continued)

(58) Field of Classification Search
CPC .. F23R 3/346; F23R 2900/03341; F02C 3/16; F02C 3/30; F02C 6/003; F02C 9/28
See application file for complete search history.

(56) References Cited

U.S. PATENT DOCUMENTS 4,081,956 A    4/1978   Baker et al.
4,272,953 A *   6/1981   Rice ...................... F01K 23/103
                                                  60/774

(Continued)

FOREIGN PATENT DOCUMENTS

| EP | 4407161 A1 | 7/2024 |
|---|---|---|
| GB | 2236145 A | 3/1991 |
| WO | 2022090990 A1 | 5/2022 |

OTHER PUBLICATIONS

Zelina et al., "Exploration of Compact Combustors for Reheat Cycle Aero Engine Applications," Proceedings of ASME Turbo Expo '06: 51st ASME International Gas Turbine and Aeroengine Congress and Exposition, p. 1-11 (2006).

(Continued)

*Primary Examiner* — William H Rodriguez
(74) *Attorney, Agent, or Firm* — Venable LLP; Griffin A. A. Deadwick; Michele V. Frank

(57) ABSTRACT

A turbine engine includes a compressor section for providing a compressed air flow, a fuel system for providing a primary combustor fuel supply, and a secondary combustor fuel supply. A primary combustor, located downstream of the compressor section, combusts the compressed air flow and the primary combustor fuel supply to generate primary combustion products. A turbine section, located downstream of the primary combustor, includes a turbine and a secondary combustor that further combusts the primary combustion products and the fuel from the secondary combustor fuel supply. A steam system provides a steam supply to the secondary combustor. The secondary combustor further combusts the primary combustion products and the secondary combustor fuel supply to generate secondary combustion (Continued)

products, and the turbine section is rotated by the secondary combustor steam supply and the inter-turbine combustion products.

20 Claims, 7 Drawing Sheets

(51) Int. Cl.
*F02C 6/00* (2006.01)
*F02C 9/28* (2006.01)
*F02C 3/16* (2006.01)

(52) U.S. Cl.
CPC ....... *F02C 3/16* (2013.01); *F23R 2900/03341* (2013.01)

(56) References Cited

U.S. PATENT DOCUMENTS

| | | | |
|---|---|---|---|
| 4,369,624 A | 1/1983 | Hamm et al. | |
| 4,571,935 A * | 2/1986 | Rice | F02C 6/18 60/39.182 |
| 5,054,279 A * | 10/1991 | Hines | F01K 21/047 60/39.5 |
| 5,329,758 A * | 7/1994 | Urbach | F01K 21/047 60/39.55 |
| 5,775,091 A * | 7/1998 | Bannister | F01D 5/084 60/39.465 |
| 5,896,740 A | 4/1999 | Shouman | |
| 5,906,095 A | 5/1999 | Frutschi et al. | |
| 6,089,024 A | 7/2000 | Hatanaka | |
| 7,726,133 B2 | 6/2010 | Hannemann et al. | |
| 8,613,186 B2 | 12/2013 | Koganezawa et al. | |
| 11,603,798 B1 | 3/2023 | Terwilliger et al. | |
| 2002/0148213 A1* | 10/2002 | Yu | F02C 3/365 60/39.17 |
| 2006/0207262 A1 | 9/2006 | Firey | |
| 2007/0003897 A1 | 1/2007 | Koizumi et al. | |
| 2007/0033918 A1* | 2/2007 | Benz | F01K 23/10 60/39.12 |
| 2007/0039468 A1* | 2/2007 | Benz | F02C 6/10 95/116 |
| 2007/0271898 A1* | 11/2007 | Little | F02C 6/18 60/39.182 |
| 2009/0260368 A1* | 10/2009 | Benz | F25J 3/04575 60/780 |
| 2014/0137564 A1* | 5/2014 | Scipio | F02C 3/30 60/39.53 |
| 2016/0115826 A1 | 4/2016 | Eroglu | |
| 2018/0252410 A1 | 9/2018 | Zelina et al. | |
| 2018/0266333 A1* | 9/2018 | Gassner | F02C 9/20 |

OTHER PUBLICATIONS

Zelina, "Technical Article: Revolutionary Combustors for Future Propulsion Systems," Global Gas Turbine News, vol. 53, No. 4, p. 51 (2023).
Daggett, "Water Injection Feasibility for Boeing 747 Aircraft," National Aeronautics and Space Administration, p. i-vi and 1-98 (2005).

* cited by examiner

SEQUENTIAL COMBUSTION GAS TURBINE ENGINE INCLUDING A STEAM SYSTEM FOR INJECTING STEAM TO EACH COMBUSTOR

TECHNICAL FIELD

The present disclosure relates generally to a turbine engine including a steam system.

BACKGROUND

Turbine engines generally include a fan and a core section arranged in flow communication with one another. A combustor is arranged in the core section to generate combustion gases for driving a turbine in the core section of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
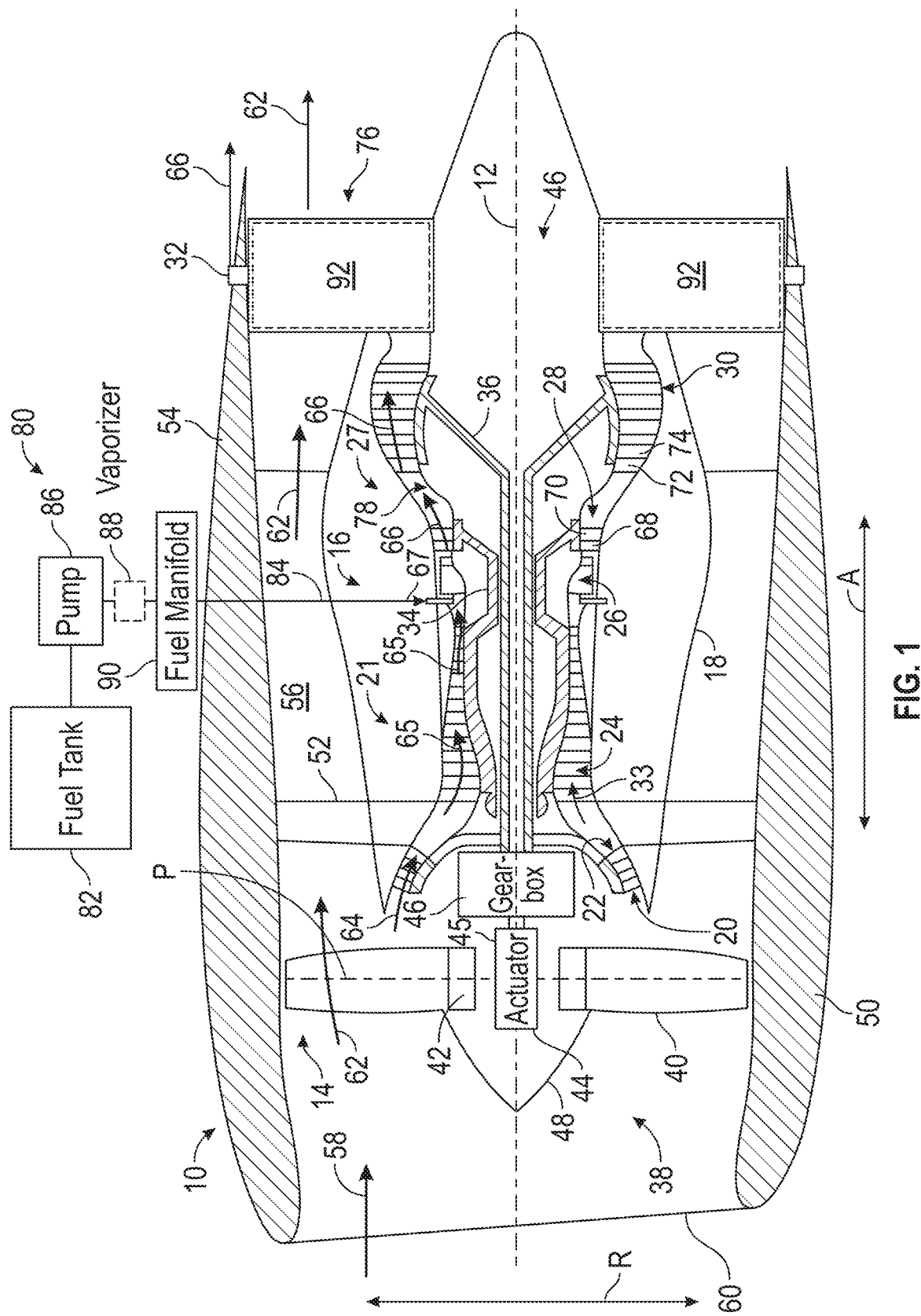
FIG. 1 is a schematic cross-sectional view of a turbine engine with a steam system, taken along a longitudinal centerline axis of the turbine engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or vehicle. For example, with regard to a turbine engine, forward refers to a position closer to an engine inlet, and aft refers to a position closer to an engine nozzle or an exhaust.

The terms "coupled," "fixed," "attached," and the like, refer to both direct coupling, fixing, or attaching, as well as indirect coupling, fixing, or attaching through one or more intermediate components or features, unless otherwise specified herein.

As used herein, the terms "low," "mid" (or "mid-level"), and "high," or their respective comparative degrees (e.g., "lower" and "higher," where applicable), when used with compressor, turbine, shaft, fan, or turbine engine components, each refers to relative pressures, relative speeds, relative temperatures, and/or relative power outputs within an engine unless otherwise specified. For example, a "low-power" setting defines the engine configured to operate at a power output lower than a "high-power" setting of the engine, and a "mid-level power" setting defines the engine configured to operate at a power output higher than a "low-power" setting and lower than a "high-power" setting. The terms "low," "mid" (or "mid-level") or "high" in such aforementioned terms may additionally or alternatively, be understood as relative to minimum allowable speeds, pressures, or temperatures, or minimum or maximum allowable speeds, pressures, or temperatures relative to normal, desired, steady state, etc., operation of the engine.

The various power levels of the turbine engine detailed herein are defined as a percentage of a sea level static (SLS) maximum engine rated thrust. Low-power operation includes, for example, less than thirty percent (30%) of the SLS maximum engine rated thrust of the turbine engine. Mid-level power operation includes, for example, thirty percent (30%) to eighty-five percent (85%) of the SLS maximum engine rated thrust of the turbine engine. High-power operation includes, for example, greater than eighty-five percent (85%) of the SLS maximum engine rated thrust of the turbine engine. The values of the thrust for each of the low-power operation, the mid-level power operation, and the high-power operation of the turbine engine are exemplary only, and other values of the thrust can be used to define the low-power operation, the mid-level power operation, and the high-power operation.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The term "combustion products" refers to all products exiting a combustor in a turbine engine, such products include all outflowing products, such as, but not limited to, the gas products from the chemical reaction of combustion such as $O_2$, $N_2$, $CO_2$, CO, $NO_x$, water vapor, soot, unspent fuel in a fuel-rich burn condition, or yet to be combusted air in a fuel-lean burn condition A high bypass ratio and high overall pressure ratios are incorporated into turbine engines in order to minimize fuel consumption and $CO_2$ emissions. Consequently, turbine engines have resulting higher operational pressures and temperatures, which, in turn, generate greater pollutant emissions, including nitrogen oxide ($NO_x$) emissions. Additional emissions of turbine engines as applied in aircraft include water vapor, which, upon exiting the turbine engine, condenses, forming condensation trails, also known as contrails. Contrail generation may be undesirable.

Accordingly, the present disclosure provides a turbine engine having one or more secondary combustors for introducing fuel and steam thereto. The one or more secondary combustors may employ a reheat cycle to reduce the overall maximum temperature of the turbine engine, thereby decreasing the emission of $NO_x$ and other pollutants. The one or more secondary combustors of the present disclosure may include an inter-turbine combustor, an inter-stage combustor, or both an inter-turbine combustor and an inter-stage combustor.

Injecting steam at the one or more secondary combustors may lower the operating temperature of the turbine engine, further reducing pollutant emissions. Additionally, injecting steam increases mass flow rate, thereby increasing thrust. Beyond reducing pollutants, lower engine temperatures may contribute to enhanced engine durability by reducing damage caused by high temperature gases flowing past various engine components, including, for example, the combustor liners and the high-pressure turbine, and the low-pressure turbine. Injecting steam at the one or more secondary combustors may allow reducing steam addition in the main combustor to improve combustion flameout or blowout. Blowout is defined as a state in which the combustor can no longer sustain combustion. Steam may be introduced into the one or more secondary combustors at any ratio from zero (no steam), up the point of blowout. A preferable steam ratio in the one or more secondary combustors may be 0.1 to 0.5 of steam to fuel ratio.

The present disclosure also includes injecting fuel in the one or more secondary combustors. In the event of loss of steam to the one or more secondary combustors, injecting fuel in the primary combustor or the one or more secondary combustors, or both, may assist in maintaining engine operation by varying the amount of fuel and, thus, varying heat addition, to the engine. In some examples, steam is injected in an amount from 0.1 to 0.5 of steam to fuel ratio.

Referring now to the drawings, FIG. 1 is a schematic cross-sectional view of a turbine engine 10 including a steam system 92, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a core turbine engine 16 disposed downstream from the fan section 14.

The core turbine engine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor (LPC) 22 followed downstream by a high-pressure compressor (HPC) 24, a primary combustor 26, a turbine section 27, including a high-pressure turbine (HPT) 28, followed downstream by a low-pressure turbine (LPT) 30, and one or more core exhaust nozzles 32. A high-pressure (HP) shaft 34 or a spool drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates. A low-pressure (LP) shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the primary combustor 26, the turbine section 27, and the one or more core exhaust nozzles 32 together define a core air flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38, at least a portion of the core turbine engine 16, or both. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween. The one or more core exhaust nozzles 32 may extend through the nacelle 50 and be formed therein. In this example, the one or more core exhaust nozzles 32 include one or more discrete nozzles that are spaced circumferentially about the nacelle 50. Other arrangements of the one or more core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 or the fan section 14. As the volume of air 58 passes across the fan blades 40, a first portion of air 62, also referred to as bypass air 62, is directed or routed into the bypass airflow passage 56, and a second portion of core air 64, also referred to as core air 64, is directed or is routed into the upstream section of the core air flow path 33, or, more specifically, into the annular core inlet 20. The ratio between the first portion of air 62 and the second portion of core air 64 is known as a bypass ratio. In some embodiments, the bypass ratio may be greater than 18:1, enabled by the steam system 92, as detailed further below. The pressure of the core air 64 is increased by the LPC 22, generating compressed air 65, and the compressed air 65 is routed through the HPC 24 and further compressed before being directed into the primary combustor 26, where the compressed air 65 is mixed with fuel 67 and burned to generate primary combustion products 66, also referred to as primary combustion gases 66.

The LPC 22, the HPC 24, or both the LPC 22 and the HPC 24 may include one or more stages, with each subsequent stage further compressing the compressed air 65. The HPC 24 may have a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled by the steam system 92, as detailed further below.

The primary combustion products 66 are routed into the HPT 28 and expanded through the HPT 28 where a portion of thermal energy or kinetic energy from the primary combustion products 66 is extracted via sequential stages of HPT stator vanes 68 that are coupled to the outer casing 18 and to a plurality of HPT rotor blades 70 that are coupled to the HP shaft 34, thus, causing the HP shaft 34 to rotate, thereby supporting operation of the HPC 24. The primary combustion products 66 are then routed into the LPT 30 and expanded through the LPT 30. Here, a second portion of thermal energy or kinetic energy is extracted from the primary combustion products 66 via sequential stages of LPT stator vanes 72 that are coupled to the outer casing 18 and to a plurality of LPT rotor blades 74 that are coupled to the LP shaft 36, thus, causing the LP shaft 36 to rotate, thereby supporting operation of the LPC 22 and rotation of the fan 38 via the gearbox assembly 46. The HPT 28, the LPT 30, or both the HPT 28 and the LPT 30 may have one or more stages. The HPC 24 having a compression ratio in a range of 20:1 to 40:1 results in the HPT 28 having a pressure expansion ratio in a range of 1.5:1 to 4:1 and the LPT 30 having a pressure expansion ratio in a range of 4.5:1 to 28:1.

The primary combustion products 66 are subsequently routed through the one or more core exhaust nozzles 32 of the core turbine engine 16 to provide propulsive thrust. Simultaneously with the flow of the core air 64 through the core air flow path 33, the bypass air 62 is routed through the bypass airflow passage 56 before being exhausted from a fan bypass nozzle 76 of the turbine engine 10, also providing propulsive thrust. The primary combustor 26, the HPT 28, the LPT 30, and the one or more core exhaust nozzles 32 at least partially define a hot gas path 78 for routing the primary combustion products 66 through the core turbine engine 16.

As noted above, the compressed air 65 (i.e., the core air 64) is mixed with the fuel 67 in the primary combustor 26 to generate a fuel and air mixture, and combusted, generating primary combustion products 66 (i.e., combustion products). The fuel 67 can include any type of fuel used for turbine engines, such as, for example, sustainable aviation fuels (SAF) including biofuels, Jet A, or other hydrocarbon fuels. The fuel 67 also may be a hydrogen-based fuel ($H_2$), that may include blends with hydrocarbon fuels. In some embodiments, the hydrogen fuel may comprise substantially pure hydrogen molecules (i.e., diatomic hydrogen). The fuel 67 may be a cryogenic fuel. For example, in examples with hydrogen fuel, the hydrogen fuel may be stored in a liquid phase at cryogenic temperatures.

The turbine engine 10 includes a fuel system 80 for providing the fuel 67 to the primary combustor 26. The fuel system 80 includes a fuel tank 82 for storing the fuel 67 therein, a fuel manifold 90, and a primary combustor fuel supply 84. The fuel tank 82 can be located on an aircraft (not shown) to which the turbine engine 10 is attached. Although a single fuel tank 82 is shown in FIG. 1, the fuel system 80 can include any number of fuel tanks 82. The fuel manifold 90 apportions the flow of fuel 67 from the fuel tank 82 for the primary combustor 26. The primary combustor fuel supply 84 provides fuel 67 from the fuel manifold 90 to the primary combustor 26. The primary combustor fuel supply 84 includes one or more lines, conduits, pipes, tubes, etc., configured to carry the fuel 67 from the fuel tank 82 to the primary combustor 26. The primary combustor fuel supply 84 also includes a pump 86 to induce the flow of the fuel 67 through the primary combustor fuel supply 84 to the primary combustor 26. In this way, the pump 86 causes the fuel 67 to flow from the fuel tank 82, through the primary combustor fuel supply 84, and into the primary combustor 26. Alternatively, the pump 86 may be integrated into the fuel manifold 90. The fuel system 80 and, more specifically, the fuel tank 82 and the primary combustor fuel supply 84, either collectively or individually, may be a fuel source for the primary combustor 26.

In some embodiments, for example, when the fuel 67 is a hydrogen fuel, the fuel system 80 includes one or more vaporizers 88 (illustrated as optionally included by dashed lines) and a fuel manifold 90 in fluid communication with the primary combustor fuel supply 84. In such an example, the hydrogen fuel is stored in the fuel tank 82 as liquid hydrogen fuel. The one or more vaporizers 88 heat the liquid hydrogen fuel. The one or more vaporizers 88 may be positioned in the flow path of the fuel 67 between the fuel tank 82 and the fuel manifold 90, and may be located downstream of the pump 86. Alternatively, the vaporizers may be incorporated into the structure of the fuel manifold 90. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel and the liquid hydrogen fuel is converted into a gaseous hydrogen fuel within the one or more vaporizers 88. The primary combustor fuel supply 84 directs the gaseous hydrogen fuel into the primary combustor 26.

In some embodiments, for example, the fuel manifold 90 is positioned downstream of the one or more vaporizers 88 and the pump 86. The fuel manifold 90 receives hydrogen fuel in a substantially completely gaseous phase, or in a substantially completely supercritical phase. The fuel manifold 90 provides the flow of fuel to the primary combustor 26 in a desired manner. More specifically, the fuel manifold 90 provides a desired volume of hydrogen fuel at, for example, a desired flow rate, to one or more fuel injectors that inject the hydrogen fuel into the primary combustor 26. The fuel system 80 can include additional components for supplying the fuel 67 from the fuel tank 82 to the primary combustor 26, such as, for example, additional pumps, valves, fuel lines, and the like.

The turbine engine 10 includes the steam system 92. The steam system 92 provides steam to components of the turbine engine 10 in order to improve or to optimize one or more parameters of engine performance.

Although not illustrated in FIG. 1, the turbine engine 10 may include a control system, such as described in more detail to follow.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
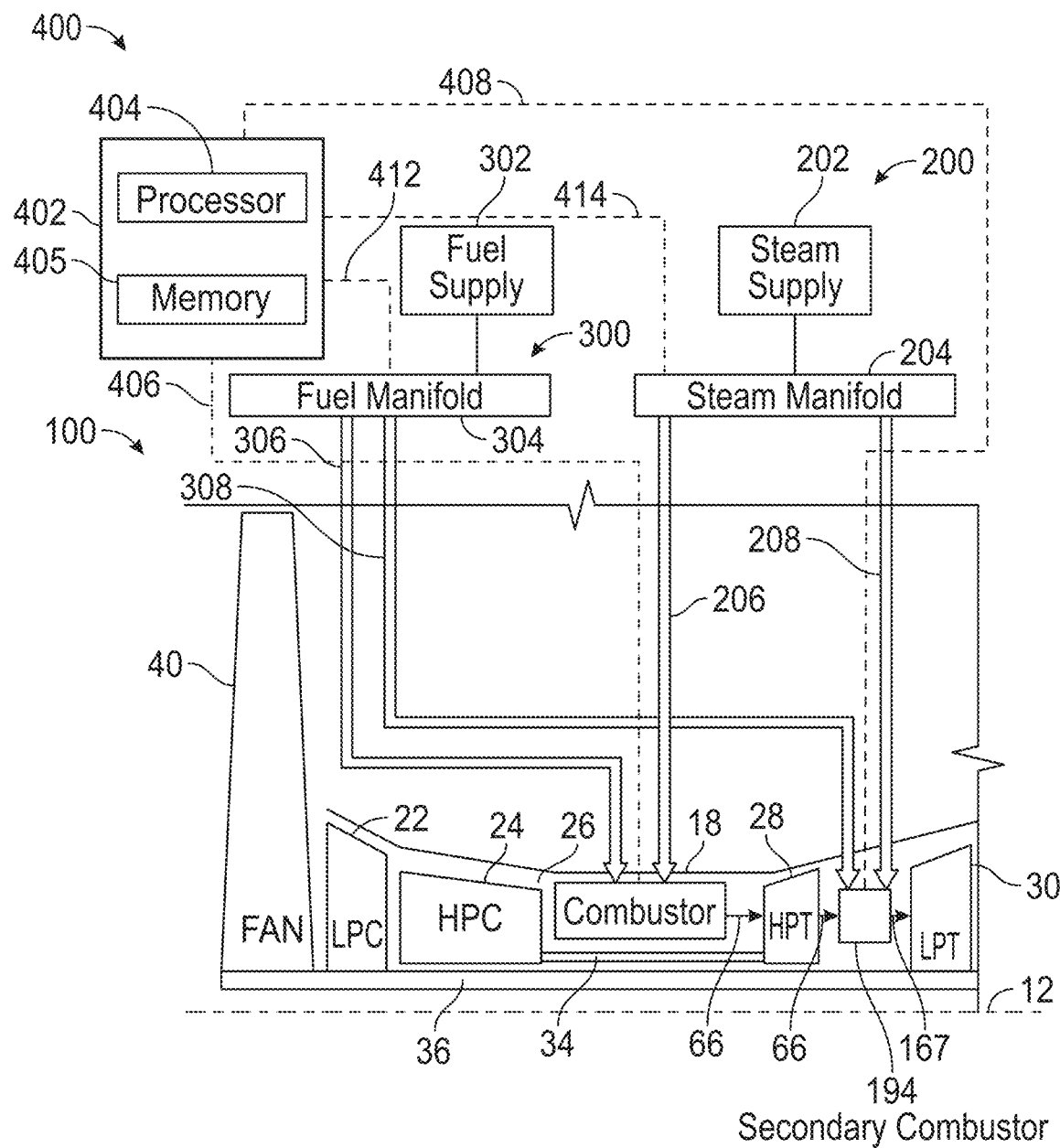
FIG. 2 is a schematic view of a portion of a turbine engine, including a steam system, a fuel system, and a control system, according to an embodiment of the present disclosure.

FIG. 2 illustrates a schematic partial view of a turbine engine 100. The turbine engine 100 is substantially similar to the turbine engine 10 described with respect to FIG. 1, with the addition of a secondary combustor 194, also referred to herein as an inter-turbine combustor 194. Accordingly, the same reference numerals will be used for components of the turbine engine 100 that are the same as or similar to the components of the turbine engine 10 discussed above. The description of these components above also applies to this embodiment, and a detailed description of these components is omitted here.

The turbine engine 100 includes the secondary combustor 194, a steam system 200, a fuel system 300, and a control system 400. In the turbine engine 100 of FIG. 2, the secondary combustor 194 is an inter-turbine combustor 194, also referred to as an inter-turbine burner (ITB) 194.

To support combustion in the turbine engine 100, the fuel system 300 includes a fuel supply 302, a fuel manifold 304, a primary combustor fuel supply 306, and a secondary combustor fuel supply 308. The secondary combustor fuel supply 308 of FIG. 2 is an inter-turbine combustor fuel supply 308. The primary combustor fuel supply 306 provides the fuel from the fuel supply 302 to the primary combustor 26 and the inter-turbine combustor fuel supply 308 provides the fuel from the fuel supply 302 to the inter-turbine combustor 194. The fuel manifold 304 apportions the flow of fuel from the fuel supply 302 between the primary combustor fuel supply 306 and the inter-turbine combustor fuel supply 308. The fuel supply 302, the fuel manifold 304, or both may include previously discussed components such as a fuel tank, a pump, a vaporizer, or combinations thereof.

The steam system 200 includes a steam supply 202, a steam manifold 204, a primary combustor steam supply 206, and a secondary combustor steam supply 208. The secondary combustor steam supply 208 of FIG. 2 is an inter-turbine combustor steam supply 208. The primary combustor steam supply 206 provides the steam from the steam supply 202 to the primary combustor 26 and the inter-turbine combustor steam supply 208 provides the steam from the steam supply 202 to the inter-turbine combustor 194. The steam manifold 204 apportions the flow of steam received from the steam supply 202 between the primary combustor steam supply 206 and the inter-turbine combustor steam supply 208.

The steam supply 202 provides steam for the steam system 200 from one or more sources, such as, but not limited to, a condensing waste heat recovery system, an onboard water supply, an onboard steam supply, or other suitable supply of liquid water, gaseous water, or combinations thereof. The steam supply 202 provides steam to the steam manifold 204, which apportions the flow of steam between the primary combustor 26 and the inter-turbine combustor 194 through the primary combustor steam supply 206 and the inter-turbine combustor steam supply 208, respectively.

In some examples, a turbine engine with the primary combustor 26 and the inter-turbine combustor 194 may, alternatively, have an inter-turbine combustor steam supply 208 and no primary combustor steam supply 206. In such case, the inter-turbine combustor steam supply 208 provides the benefits of increasing energy at the inter-turbine combustor steam supply 208 and downstream of the inter-turbine combustor steam supply 208, and reducing temperature at or near the exit of the inter-turbine combustor 194.

As described previously, air is progressively compressed through the LPC 22 and the HPC 24 of the turbine engine 100 and then flows to the primary combustor 26 where the air is mixed with the fuel from the primary combustor fuel supply 306 and the steam from the primary combustor steam supply 206. The mixture of the steam, the fuel, and the air is combusted, producing the primary combustion products 66. The primary combustion products 66 flow into the HPT 28, wherein the HPT 28 extracts thermal or kinetic energy from the primary combustion products 66, supporting the rotation of the HP shaft 34 and the HPC 24.

At the exit of the HPT 28, the primary combustion products 66 have a lower temperature relative to the temperature at the exit of the primary combustor 26. Following the HPT 28, the primary combustion products 66 flow into the inter-turbine combustor 194. In the inter-turbine combustor 194, the primary combustion products 66 mix with the fuel from the inter-turbine combustor fuel supply 308 and the steam from the inter-turbine combustor steam supply 208. The mixture of the primary combustion products 66, the steam, and the fuel has a lower temperature than the primary combustion products 66 alone. The mixture is combusted in the inter-turbine combustor 194 generating secondary combustion products 167, also referred to herein as inter-turbine combustion products 167. The inter-turbine combustion products 167 flow into the LPT 30, where the LPT 30 extracts a portion of the thermal energy, the kinetic energy, or both the thermal energy and the kinetic energy from the inter-turbine combustion products 167. The flow of the inter-turbine combustion products 167 through the LPT 30 contributes to the rotation of the LPT 30, the LPC 22 and the LP shaft 36. Following the LPT 30, the inter-turbine combustion products 167 resume the flow path as described with respect to FIG. 1.

The inter-turbine combustor 194 provides a secondary combustion process in addition to the primary combustion process of the primary combustor 26. Such a secondary combustion process is also referred to as a reheat cycle. By conducting a portion of the total combustion in each of the primary combustor 26 and the inter-turbine combustor 194, the total combustion is separated into multiple separate combustion processes with an intermediate temperature reduction in the primary combustion products 66 occurring through the energy extraction in the first turbine, in this case, the HPT 28, disposed between the primary combustor 26 and the inter-turbine combustor 194.

This separated combustion may reduce the maximum temperature at the primary combustor 26 relative to a substantially similar capacity turbine engine without a secondary combustor (such as the inter-turbine combustor 194). A lower maximum temperature may serve to improve durability of the turbine engine 100, extend the life of the turbine engine 100, extend the life of the components of the turbine engine 100 susceptible to high heat, or any combination thereof. Examples of the components susceptible to high heat may include the surfaces and the components of the primary combustor 26, the surfaces and the components of the HPT 28, or both. The surfaces may be, for example, but not limited to, inner surfaces, inner liners, surface coatings, or the like. The components may include, for example, but not limited to, bearings. Additionally or alternatively, the lower maximum temperature of the primary combustor may serve to reduce pollutants, such as nitrogen oxides.

The maximum temperature of the inter-turbine combustion products 167 occurs at or near the exit of the inter-turbine combustor 194. As mentioned, the HPT 28 lowers the temperature of the primary combustion products 66 prior to combustion in the inter-turbine combustor 194. This results in lowering the overall maximum temperature of the turbine engine 100, including lowering the temperature of the flow therethrough, which may occur either at or near the exit of the primary combustor 26, at or near the exit of the inter-turbine combustor 194, or both, relative to a substantially similar capacity turbine engine without a secondary combustor (such as the inter-turbine combustor 194).

The control system 400 of FIG. 2 includes a controller 402 that may be communicatively and operatively coupled to the fuel system 300, the steam system 200, the primary combustor 26, and the secondary combustor 194. For example, the controller 402 may send, receive, or both send and receive a primary combustor data signal 406 from the primary combustor 26, a secondary combustor data signal 408 (also referred to herein as an inter-turbine combustor data signal 408) from the secondary combustor 194, a fuel manifold control signal 412 to the fuel system 300, and a steam manifold control signal 414 to the steam system 200. The controller 402 relies on the primary combustor data signal 406 and the inter-turbine combustor data signal 408 to determine the appropriate fuel manifold control signal 412 and to determine the appropriate steam manifold control signal 414. The primary combustor data signal 406 and the inter-turbine combustor data signal 408 may provide operational state information about the primary combustor 26 and the inter-turbine combustor 194, respectively.

Such signals may include information related to a temperature, a pressure, a mass flow rate, a moisture content, $NO_x$ emissions, measurable values relevant to the performance of the turbine engine 100 or relevant to the state of the turbine engine at a location of measurement within the turbine engine 100, or combinations thereof. Although not illustrated, the signals may reflect data collected from other locations in the turbine engine 100, such as, for example, immediately aft of the primary combustor 26 or immediately aft of the HPT 28, to provide indirect measuring of the state or the condition of the primary combustor 26 or the secondary combustor 194. The primary combustor data signal 406, for example, may include temperature data taken within the primary combustor 26. The temperature information may allow for control of the fuel system 300, the steam system 200, the combustors, or combinations thereof to ensure the temperature is maintained within a predetermined range or below a high temperature threshold. The controller 402 may process the signals received from the primary combustor data signal 406, the inter-turbine combustor data signal 408, or both, to determine the appropriate fuel manifold control signal 412 and the steam manifold control signal 414 to send to the fuel manifold 304 and the steam manifold 204, respectively. The appropriate fuel manifold control signal 412 and the appropriate steam manifold control signal 414 may depend on the operating condition of the turbine engine 100 and the information gathered (e.g., the data signals) from the combustors, as described in more detail to follow.

The controller 402 may be an engine controller. The controller 402 is configured to operate various aspects of the turbine engine 100, including, in the embodiments discussed herein, the fuel system 300, the steam system 200, the primary combustor 26, and the secondary combustor 194. The controller 402 may be a Full Authority Digital Engine Control (FADEC). In this embodiment, the controller 402 is a computing device having one or more processors 404 and one or more memories 405. The processor 404 may be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 405 may include one or more computer-readable media, including, but not limited to, non-transitory computer-readable media, a computer-readable non-volatile medium (e.g., a flash memory), a RAM, a ROM, hard drives, flash drives, and/or other memory devices.

The memory 405 may store information accessible by the processor 404, including computer-readable instructions that may be executed by the processor 404. The instructions may be any set of instructions or a sequence of instructions that, when executed by the processor 404, causes the processor 404 and the controller 402 to perform operations. In some embodiments, the instructions may be executed by the processor 404 to cause the processor 404 to complete any of the operations and functions for which the controller 402 is configured, as described herein. The instructions may be software written in any suitable programming language or may be implemented in hardware. Additionally or alternatively, the instructions may be executed in logically and/or virtually separate threads on the processor 404. The memory 405 may further store data that may be accessed by the processor 404. The memory 405 may apply certain rules or control logic, which control the apportionment of fuel and steam. Such rules may apply to engine power, emissions targets, engine safety parameters, engine efficiency, or any other such relevant measurable output.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

The control system 400 allows for control of the turbine engine 100 during different power requirements and operating requirements at different phases of operation. For example, when included in an aircraft, different phases of flight have different thrust requirements for the turbine engine 100. Accordingly, the primary combustor 26 and the inter-turbine combustor 194 may be independently activated by the control system 400, according to a turbine engine input control parameter. Such turbine engine input control parameters may include a turbine engine thrust, a temperature of a location in the turbine engine, a temperature of the turbine engine exhaust, a pressure at a location in the turbine engine, a fuel consumption rate, an exhaust moisture content, or a steam consumption rate. This allows for adjusting the amount of combustion and the resultant total thrust from the turbine engine 100 to provide more thrust or less thrust for the particular phase of flight. For example, in a takeoff phase, the control system 400 may supply the fuel from the fuel system 300 and the steam from the steam system 200 to both the primary combustor 26 and the inter-turbine combustor 194 to operate both combustors at or near full capacity in order to generate maximum thrust from the turbine engine 100. In another example, in a descent phase, the control system may reduce or eliminate the fuel, the steam, or both the fuel and the steam to the primary combustor 26, the inter-turbine combustor 194, or both. Reducing or eliminating the fuel reduces total thrust from the turbine engine 100. In an intermediate phase of flight (e.g., level flight or cruise), the control system may adjust the fuel, the steam, or both the fuel and the steam to the primary combustor 26, the inter-turbine combustor 194, or both, to a level between the takeoff levels and the descent levels to accomplish the appropriate amount of thrust to maintain altitude and speed.

The present disclosure, therefore, provides for adjusting the apportionment of steam through the steam manifold 204 to the primary combustor steam supply 206 and the secondary combustor steam supply 208, which may allow for manipulating the steam effects on the turbine engine 100. The present disclosure, therefore, provides for adjusting the apportionment of fuel from the fuel manifold 304 to the primary combustor fuel supply 306 and to the inter-turbine combustor fuel supply 308 and, thus, to the primary combustor 26 and the inter-turbine combustor 194, respectively. Therefore, the control system 400 controls the apportionment of steam from the steam manifold 204 and fuel from the fuel manifold 304 to the primary combustor 26 and the inter-turbine combustor 194.

As noted previously, introducing steam into the primary combustor 26 increases the mass flow rate of the primary combustion products 66, resulting in a net increase in energy introduced into the HPT 28. Consequently, introducing steam (e.g., from primary combustor steam supply 206) into the primary combustor 26 increases the net power output by the HPT 28. Such a net increase in energy, and the resultant net increase in power generated by the HPT 28, may allow for an overall smaller turbine engine 100 relative to a turbine engine of substantially similar power capacity, or for a larger capacity turbine engine 100 relative to a turbine engine of substantially similar size, without a primary combustor steam supply 206.

Additionally, introducing steam into the primary combustor 26 may serve to cool the primary combustion products 66, consequently, cooling elements of the primary combustor 26 and lowering the maximum temperature at or near the exit of the primary combustor 26 (beyond the already lowered temperature that occurs by removing some combustion to the inter-turbine combustor 194). As previously discussed, lowering the primary combustor 26 maximum temperature may result in lower emissions, improved durability of the turbine engine 100, or both.

Introducing steam into the inter-turbine combustor 194 increases the mass flow rate of the inter-turbine combustion products 167 flowing through the LPT 30 and lowers the maximum temperature in the inter-turbine combustor 194. Increasing the mass flow rate of the inter-turbine combustion products 167 results in a net increase in energy introduced into the LPT 30, and, thus, increases the net power output by the LPT 30. Such a net increase in energy, and the resultant net increase in power generated by the LPT 30, may allow for an overall smaller turbine engine 100 relative to a turbine engine of substantially similar power capacity, or for a larger capacity turbine engine 100 relative to a turbine engine of substantially similar size, without the inter-turbine combustor 194 having the inter-turbine combustor steam supply 208. Lowering the maximum temperature in the inter-turbine combustor 194 further reduces the production of $NO_x$ emissions and reduces the risk of temperature induced degradation of the inter-turbine combustor 194, the LPT 30, and other downstream components.

Accordingly, the turbine engine 100, with both the primary combustor 26 and the inter-turbine combustor 194, each having steam introduction and fuel introduction, allows independently allocating and apportioning, with the control system 400, each of the fuel and the steam as desired to optimize various output parameters of the turbine engine 100 according to the operating condition of the turbine engine 100.

Referring back to the control system 400 of FIG. 2, the fuel manifold control signal 412 provides input data to the fuel manifold 304 to apportion the amount, the rate, or both the amount and the rate of fuel flowing from the fuel supply 302 to the primary combustor fuel supply 306 and the inter-turbine combustor fuel supply 308. The fuel manifold control signal 412, therefore, may provide input data to valves, pumps, or other components of the fuel manifold 304 that allow for control of the amount or the rate of flow through the primary combustor fuel supply 306 and the inter-turbine combustor fuel supply 308. Similarly, the steam manifold control signal 414 provides input data to the steam manifold 204 to apportion the amount, the rate, or both the amount and the rate of steam flowing from the steam supply 202 to the primary combustor steam supply 206 and the inter-turbine combustor steam supply 208. The steam manifold control signal 414, therefore, may provide input data to valves, pumps, or other components of the steam manifold 204 that allow for control of the amount or the rate of flow through the primary combustor steam supply 206 and the inter-turbine combustor steam supply 208. Additionally, supply of the fuel, the steam, or both the fuel and the steam from the fuel manifold 304 and the steam manifold 204, respectively, may be shut off entirely to one or both of the primary combustor 26 or the inter-turbine combustor 194, depending on the operating requirements of the turbine engine 100, as discussed above.

In some examples, the steam supply 202 may be limited or the steam supply 202 may be eliminated. This may be referred to as a limited steam condition, and may occur in situations when less steam is generated in a heat recovery system than may be required for a power setting, in situations with a limited or a finite capacity steam source, or in situations when the steam supply is unavailable. In such conditions of limited steam supply 202, if temperatures at certain locations of the turbine engine 100 approach a high-temperature threshold (as measured by one or more sensors provided within the turbine engine 100), the controller 402 may allocate additional steam from the limited steam supply 202 to the position in question, such as the primary combustor 26 or the inter-turbine combustor 194, to avoid degradation of engine components due to high temperature. Reallocating the steam may reduce overall engine performance, such as total thrust, or may increase emissions, in favor of the higher priority protection the overall safety of the turbine engine 100. In this example, the limited steam supply 202 condition may result in the controller 402 providing adequate steam from the primary combustor steam supply 206 to keep the maximum temperature of the primary combustor 26 or the HPT 28, as indicated by the primary combustor data signal 406, below a predetermined temperature threshold. The controller 402 signals, via the steam manifold control signal 414, to allocate as a priority over other locations, sufficient steam to the primary combustor 26, to resolve the high-temperature condition via increased primary combustor steam supply 206. Upon allocating sufficient steam to the primary combustor 26, there may be insufficient available steam supply 202 remaining to support the inter-turbine combustor 194. In such a case, the inter-turbine combustor steam supply 208 will necessarily be reduced due to limited overall steam supply 202, and the controller 402 may therefore decrease the inter-turbine combustor fuel supply 308 to correlate with the available remaining steam supply 202 for the inter-turbine combustor steam supply 208, so as not to exceed a high temperature threshold for the inter-turbine combustor 194 or the LPT 30. A similar control function may occur in the event of a high temperature condition in the inter-turbine combustor 194.

Additionally or alternatively, the apportionment of the steam supply 202 may be optimized such as to minimize $NO_x$ emissions, to minimize the total fuel consumption, or both. If the steam supply 202 includes extraction of water vapor from the exhaust flow of the turbine engine 100, the resulting reduction in water vapor in the exhaust may reduce the generation of contrails. Accordingly, increased steam flow may reduce contrail generation.

In some examples, the control system 400 may prioritize providing the steam, the fuel, or both the steam and the fuel to the primary combustor 26 or the inter-turbine combustor 194, relative to the other. For example, a given quantity of steam introduced at the primary combustor 26 may have a greater net effect on total thrust from the turbine engine 100 than the same quantity of steam introduced at the inter-turbine combustor 194. In a flight phase such as takeoff, when maximum thrust is desired, and the available steam supply 202 is limited, the controller may prioritize providing steam from the steam supply 202 to the primary combustor 26, without resulting in blowout in the primary combustor 26, in order to achieve the greatest thrust benefit, while allocating a relatively lesser amount of steam or allocating the remainder of the available of steam to the inter-turbine combustor 194.

In some examples, an excess steam condition may be present, wherein the steam supply 202 is greater than the total steam the controller 402 determines to allocate to the primary combustor 26 and the inter-turbine combustor 194, together, or is greater than the total steam the combustors can accommodate. For example, an idle condition, a descent phase, a cruise phase, precipitation, or overly humid environments can cause an excess steam condition. This occurs when the amount of steam generated exceeds the amount of steam required to operate the primary combustor 26 and the inter-turbine combustor 194 in the current operating condition. In such circumstances, the controller 402 allocates a predetermined amount of steam to the primary combustor steam supply 206 and the inter-turbine combustor steam supply 208. The predetermined amount of steam is limited by the amount that each combustor can accommodate safely without resulting in blowout, to avoid loss in total energy or a loss in thrust. In such conditions, when the steam supply 202 is greater than can be accommodated, additional steam is discharged from the turbine engine 100 without passing through the combustors. The above situations are exemplary and the control system 400 may selectively and independently control each of the fuel and the steam to each of the primary combustor 26 and the secondary combustor 194 based on signals received from the combustors (e.g., from sensors or from the primary combustor data signal 406 and the inter-turbine combustor data signal 408), based on an operating condition of the turbine engine 100, based on a desired operating condition of the turbine engine 100, or any combination thereof.

Figure 3:
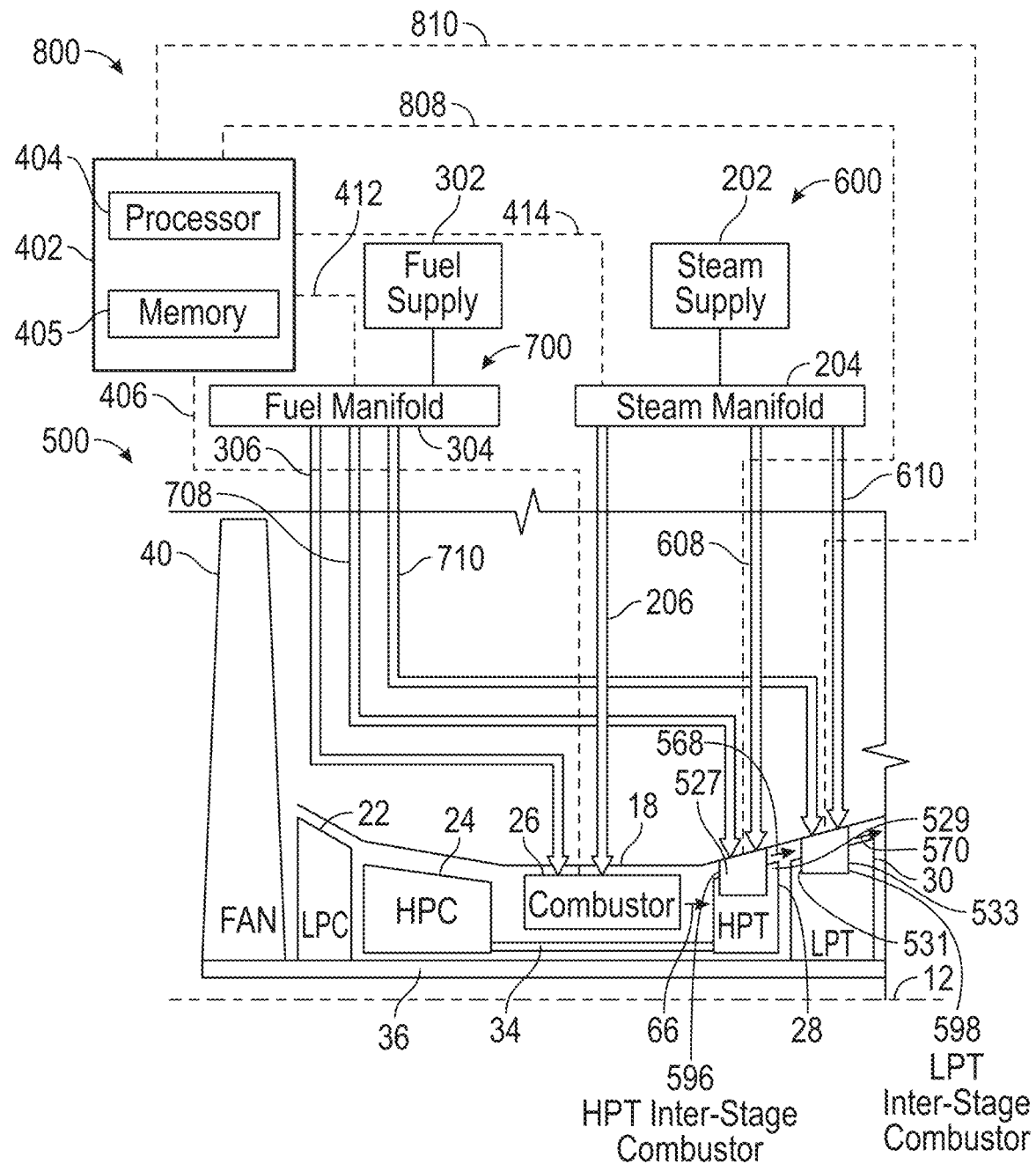
FIG. 3 is a schematic view of a portion of a turbine engine, including a steam system, a fuel system, and a control system, according to an embodiment of the present disclosure.

FIG. 3 illustrates a schematic partial view of a turbine engine 500. The turbine engine 500 is substantially similar to the turbine engine 100 described with respect to FIG. 2, except for the orientation of the secondary combustors, as described below. Accordingly, the same reference numerals will be used for components of the turbine engine 500 that are the same as or similar to the components of the turbine engine 100 and the turbine engine 10 as discussed above. The description of these components above also applies to this embodiment, and a detailed description of these components is omitted here.

The turbine engine 500 includes a fuel system 700, a steam system 600, and a control system 800. The turbine engine 500 includes a primary combustor 26, a secondary combustor 596, and a tertiary combustor 598. The secondary combustor 596 may be a high pressure turbine (HPT) inter-stage combustor 596 and the tertiary combustor 598 may be a low pressure turbine (LPT) inter-stage combustor 598. Although both the HPT inter-stage combustor 596 and the LPT inter-stage combustor 598 are depicted, only one (either the HPT inter-stage combustor 596 or the LPT inter-stage combustor 598) may be provided.

In the turbine engine 500, the HPT 28 and the LPT 30 are each a multi-stage turbine, as described above. The HPT inter-stage combustor 596 is disposed between successive stages of the HPT 28. That is, the HPT inter-stage combustor 596 is disposed between an HPT first stage 527 of the HPT 28 and an HPT second stage 529 of the HPT 28, with the HPT first stage 527 and the HPT second stage 529 being adjacent with no intervening stages. The LPT inter-stage combustor 598 is disposed between stages of the LPT 30. That is, the LPT inter-stage combustor 598 is disposed between an LPT first stage 531 of the LPT 30 and an LPT second stage 533 of the LPT 30, with the LPT first stage 531 and the LPT second stage 533 being adjacent with no intervening stages.

The steam system 600 includes the steam supply 202, the steam manifold 204, and the primary combustor steam supply 206, described with respect to FIG. 2. The steam system 600 also includes a secondary combustor steam supply 608, also referred to herein as an HPT inter-stage combustor steam supply 608, and a tertiary combustor steam supply 610, also referred to herein as an LPT inter-stage combustor steam supply 610.

The fuel system 700 includes the fuel supply 302, the fuel manifold 304, and the primary combustor fuel supply 306, described with respect to FIG. 2. The fuel system 700 also includes a secondary combustor fuel supply 708, also referred to herein as an HPT inter-stage combustor fuel supply 708, and a tertiary combustor fuel supply 710, also referred to herein as an LPT inter-stage combustor fuel supply 710.

The control system 800 is substantially the same as the control system 400, except that, instead of the inter-turbine combustor data signal 408, the control system 800 includes a secondary combustor data signal 808 between the controller 402 and the HPT inter-stage combustor 596 and a tertiary combustor data signal 810 between the controller 402 and the LPT inter-stage combustor 598. The secondary combustor data signal 808, also referred to herein as an HPT inter-stage combustor data signal 808, and the tertiary combustor data signal 810, also referred to herein as an LPT inter-stage combustor data signal 810, are substantially the same as the data signals described with respect to FIG. 2, except that the data signals of FIG. 3 provide data from the HPT inter-stage combustor 596 and the LPT inter-stage combustor 598, respectively.

Operation of the turbine engine 500 is substantially the same as operation of the turbine engine 100 described with respect to FIG. 2.

As discussed above, the primary combustion products 66 flow into the HPT 28. More specifically, the primary combustion products 66 flow into the HPT first stage 527, wherein thermal or kinetic energy is extracted from the primary combustion products 66, contributing to the rotation of the HP shaft 34 and the HPC 24. Upon exiting the HPT first stage 527, the primary combustion products 66 enter the HPT inter-stage combustor 596 and are mixed with fuel (from the HPT inter-stage combustor fuel supply 708) and steam (from the HPT inter-stage combustor steam supply 608). The mixture is combusted to generate secondary inter-stage combustion products 568, also referred to herein as HPT inter-stage combustion products 568, that flow into the HPT second stage 529. At or near the HPT inter-stage combustor 596, the HPT inter-stage combustor steam supply 608 introduces steam. The HPT second stage 529 extracts a portion of the thermal energy or the kinetic energy from the HPT inter-stage combustion products 568, additionally contributing to the rotation of the HP shaft 34 and the HPC 24. The HPT inter-stage combustion products 568 exit from the HPT 28 and flow into the LPT first stage 531 for further extraction of the thermal energy or the kinetic energy, thereby supporting rotation of the LP shaft 36 and the LPC 22. Upon exiting the LPT first stage 531, prior to flowing into the LPT second stage 533, the HPT inter-stage combustion products 568 flow into the LPT inter-stage combustor 598. The HPT inter-stage combustion products 568 are mixed with fuel (from the LPT inter-stage combustor fuel supply 710) and steam (from the LPT inter-stage combustor steam supply 610) and the mixture is combusted to generate LPT inter-stage combustion products 570. The LPT inter-stage combustion products 570 then flow through the LPT second stage 533, where further extraction of the thermal energy or the kinetic energy occurs, additionally supporting rotation of the LP shaft 36 and the LPC 22.

By conducting a portion of the total combustion in the primary combustor 26, a portion of the combustion in the HPT inter-stage combustor 596, and a portion of the combustion in the LPT inter-stage combustor 598, the total combustion is separated into multiple separate combustion processes, thereby reducing the maximum temperature at the primary combustor 26 relative to a substantially similar capacity turbine engine with a single combustor. The maximum temperature of the HPT inter-stage combustion products 568 occurs at or near the exit of the HPT inter-stage combustor 596 and the maximum temperature of the LPT inter-stage combustion products 570 occurs at or near the exit of the LPT inter-stage combustor 598. As discussed previously, lowering the temperature of the primary combustion products 66 through the HPT first stage 527 prior to combustion in the HPT inter-stage combustor 596 and lowering the temperature of the HPT inter-stage combustion products 568 prior to combustion in the LPT inter-stage combustor 598, lowers the overall maximum temperature of the turbine engine 500, which may occur at or near any of the exit of the primary combustor 26, the HPT inter-stage combustor 596, or the LPT inter-stage combustor 598, relative to a substantially similar capacity turbine engine with a single combustor. The turbine engine 500 thus increases the mass flow rate and reduces the temperatures, as described, with respect to the turbine engine 100. Likewise, the control system 800 may control the flow of steam and the flow of fuel to each of the HPT inter-stage combustor 596 and the LPT inter-stage combustor 598, as described, with respect to the control system 400 of the turbine engine 100.

Although a single inter-stage combustor is illustrated in each of the HPT 28 and the LPT 30, more or fewer may be provided. For example, two or more inter-stage combustors may be present in the HPT 28 or the LPT 30 or both. In another example, only one of the HPT 28 or the LPT 30 may have one or more inter-stage combustors. Accordingly, any quantity or combination as may be advantageous to the size, shape, layout, manufacture, operation, or performance of the engine may be provided. Further, a turbine engine with one, three, or any other number of turbines may similarly employ any number of inter-stage combustors. The total number of inter-stage combustors available to each turbine of a turbine engine is equal to one fewer than the number of stages present in the turbine.

Figure 4:
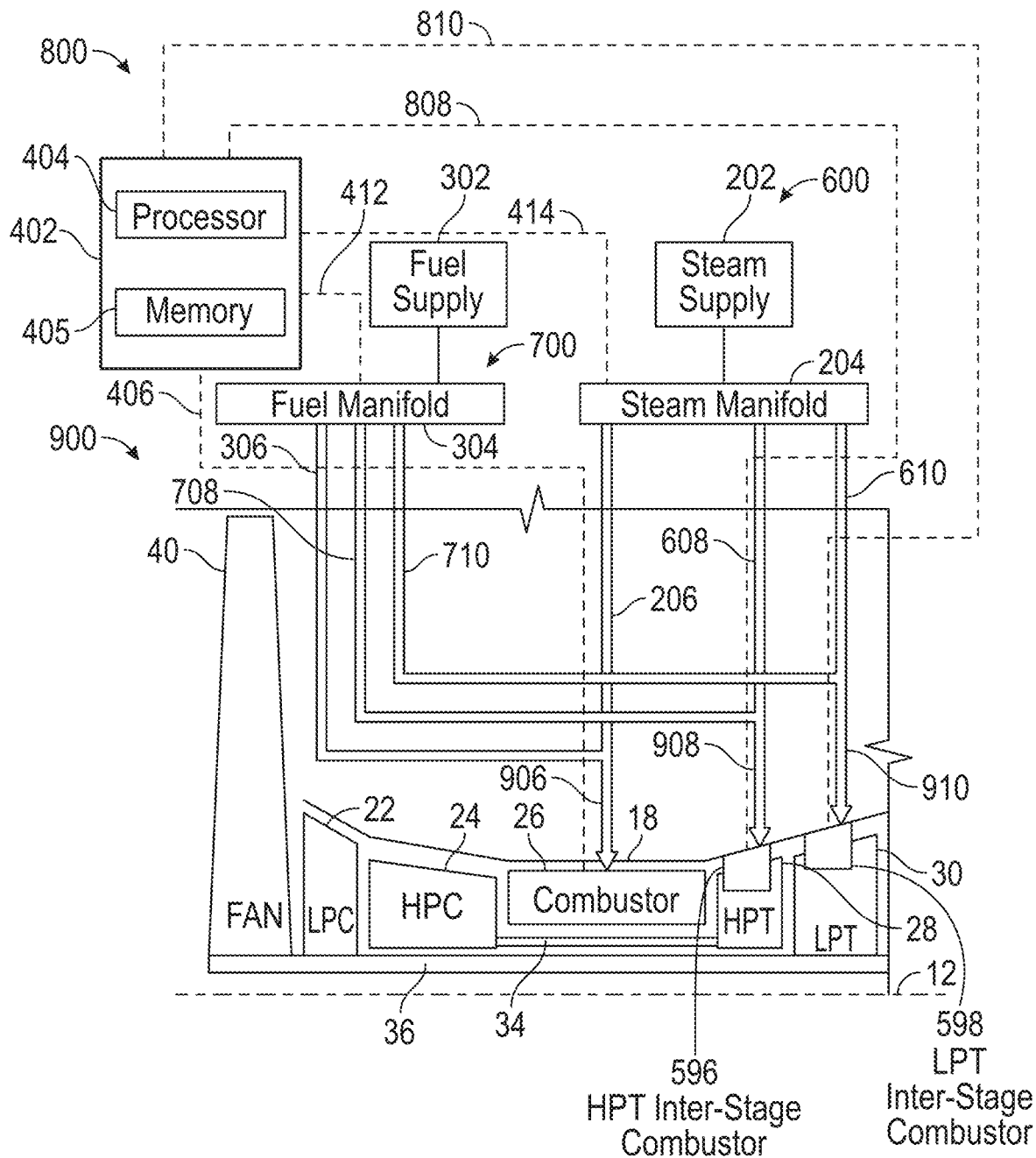
FIG. 4 is a schematic view of a portion of a turbine engine, including a steam system, a fuel system, and a control system, according to an embodiment of the present disclosure.

FIG. 4 illustrates a schematic partial view of a turbine engine 900. The turbine engine 900 is substantially similar to the turbine engine 500 described with respect to FIG. 3, except for the manner in which the fuel flow and the steam flow are introduced into each of the combustors, as described below. Accordingly, the same reference numerals will be used for components of the turbine engine 900 that are the same as or similar to the components of the turbine engine 500, the turbine engine 100, and the turbine engine 10 as discussed above. The description of these components above also applies to this embodiment, and a detailed description of these components is omitted here. Likewise, the operation of the turbine engine 900 is substantially the same as operation of the turbine engine 500 described with respect to FIG. 3.

FIG. 4 illustrates comingling the fuel flow from the fuel manifold 304 and the steam flow from the steam manifold 204 prior to entry into the combustors. For example, the primary combustor fuel supply 306 and the primary combustor steam supply 206 are combined in a primary combustor fuel and steam supply 906 and introduced into the primary combustor 26 as a combined fuel-steam flow. The HPT inter-stage combustor fuel supply 708 and the HPT inter-stage combustor steam supply 608 are combined in an HPT inter-stage combustor fuel and steam supply 908 (also referred to herein as a secondary inter-stage combustor fuel and steam supply 908) and introduced into the HPT inter-stage combustor 596. The LPT inter-stage combustor fuel supply 710 and the LPT inter-stage combustor steam supply 610 are combined in an LPT inter-stage combustor fuel and steam supply 910 (also referred to herein as a tertiary inter-stage combustor fuel and steam supply 910) and introduced into the LPT inter-stage combustor 598.

Joining the fuel and steam supplies as described may enhance mixing of the fuel and the steam prior to introduction into the primary combustor 26, the HPT inter-stage combustor 596, and the LPT inter-stage combustor 598, respectively. Enhanced mixing may allow for more even fuel burn, may prevent partial blowout, or both. Additionally or alternatively, such joining may leverage the limited space within the turbine engine 900.

Although illustrated for each of the combustors, joining the fuel and the steam may be performed in part or in whole. In other words, one or more of the fuel and steam supply for the primary combustor 26, the HPT inter-stage combustor 596, or the LPT inter-stage combustor 598 may have a joined a fuel and steam supply, while one or more may not.

The examples illustrated in FIGS. 2 to 4 are exemplary and various features therein may be combined among the examples. For example, although shown in the example of FIG. 3, the fuel supply and the steam supply of the turbine engine 100 (FIG. 2) may optionally be joined on the primary combustor fuel supply 306 and the primary combustor steam supply 206 for the primary combustor 26, on the inter-turbine combustor fuel supply 308 and the inter-turbine combustor steam supply 208, or both.

Figure 5:
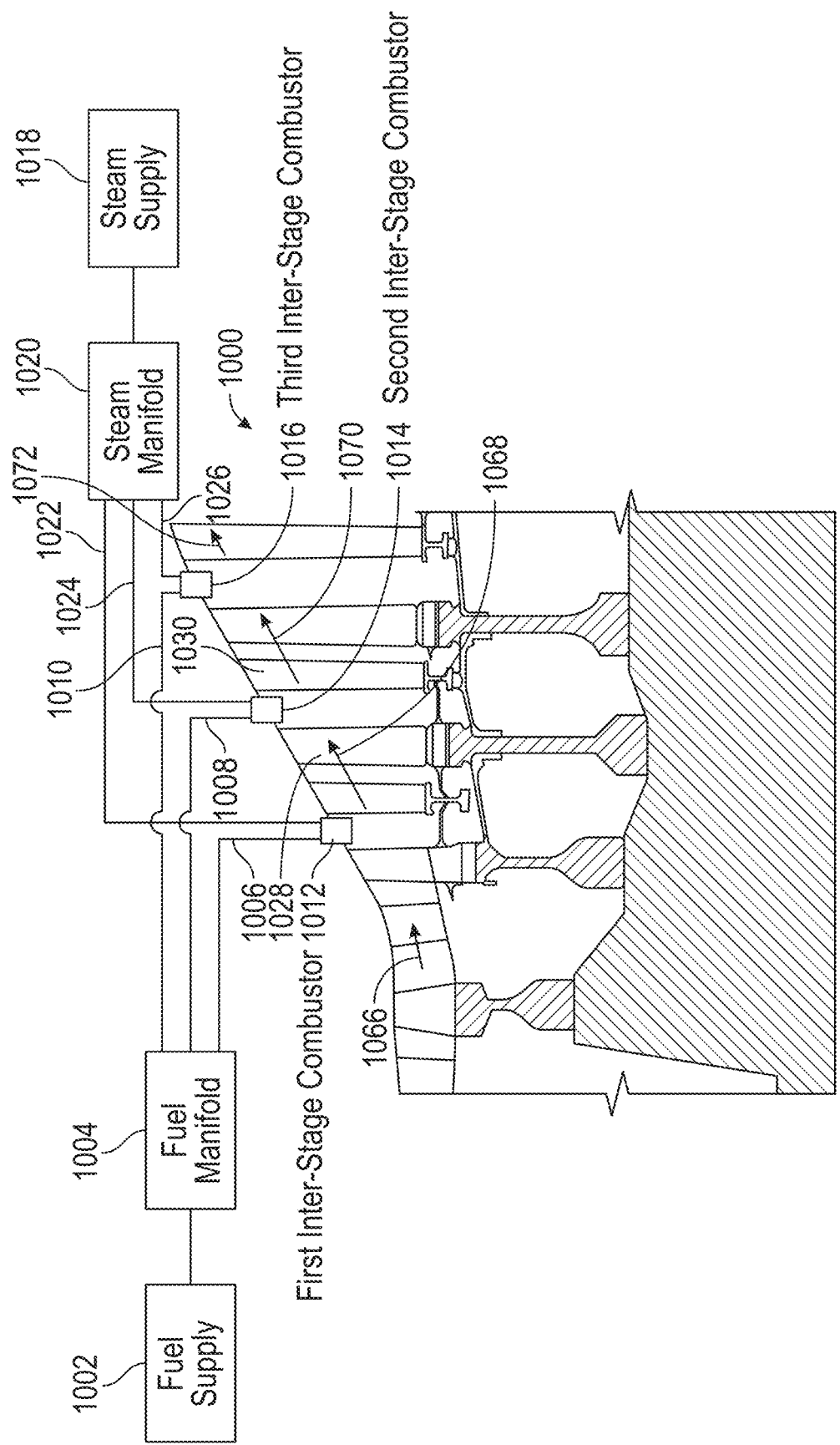
FIG. 5 is a schematic cross-sectional view of a turbine section of a turbine engine, taken along a longitudinal centerline axis of the turbine engine, the turbine section including a steam system and a fuel system, according to an embodiment of the present disclosure.

FIG. 5 illustrates a multi-stage turbine 1000 that may be either or both of the HPT 28 or the LPT 30 having an inter-stage combustor as described with respect to FIG. 4. Either or both of the HPT inter-stage combustor 596 or the LPT inter-stage combustor 598 described with respect to FIG. 4 may include multiple distinct inter-stage combustors between multiple stages of the turbine, as described in more detail to follow. The multi-stage turbine 1000 contains rotor blades 1028 and stator vanes 1030 corresponding to the stages of the multi-stage turbine 1000. The exemplary multi-stage turbine 1000 of FIG. 5 has four-stages. More or fewer may, however, be provided. The multi-stage turbine 1000 may include one or more inter-stage combustors, such as a first inter-stage combustor 1012, a second inter-stage combustor 1014, and a third inter-stage combustor 1016. Although three interstage combustors are illustrated and described, more or fewer may be provided. For example, a turbine of n stages may contain up to n−1 inter-stage combustors. Although illustrated among the first stage, the second stage, and the third stage of the multi-stage turbine 1000, one or more of the inter-stage combustors may be omitted, or the inter-stage combustors may begin at a second stage or a third stage of the multi-stage turbine 1000, etc., or both.

The first inter-stage combustor 1012, the second inter-stage combustor 1014, and the third inter-stage combustor 1016, may be disposed among successive rotor blades of the successive stages, successive stator vanes of the successive stages, or between a rotor blade of one stage of the successive stages and a stator vane of the other stage of the successive stages.

The first inter-stage combustor 1012 receives first combustion products 1066 from upstream of the first inter-stage combustor 1012. In examples with the multi-stage turbine 1000 following the primary combustor 26 (FIG. 3), the first combustion products 1066 are the primary combustion products 66 (FIG. 3). In examples with the multi-stage turbine 1000 following another turbine, such as in examples when the multi-stage turbine 1000 is the LPT 30, the first combustion products 1066 are the secondary inter-stage combustion products 568 (FIG. 3). The first inter-stage combustor 1012 receives the first combustion products 1066, a first inter-stage combustor fuel supply 1006 from a fuel manifold 1004, and a first inter-stage combustor steam supply 1022 from a steam manifold 1020, which are mixed and combusted in the first inter-stage combustor 1012, generating first inter-stage combustion products 1068. The second inter-stage combustor 1014 receives the first inter-stage combustion products 1068 from the first inter-stage combustor 1012, a second inter-stage combustor fuel supply 1008 from the fuel manifold 1004, and a second inter-stage combustor steam supply 1024 from the steam manifold 1020, which are mixed and combusted in the second inter-stage combustor 1014, generating second inter-stage combustion products 1070.

The third inter-stage combustor 1016 receives the second inter-stage combustion products 1070 from the second inter-stage combustor 1014, a third inter-stage combustor fuel supply 1010 from the fuel manifold 1004, and a third inter-stage combustor steam supply 1026 from the steam manifold 1020, which is then combusted in the third inter-stage combustor 1016, generating third stage inter-stage combustion products 1072.

The fuel manifold 1004 and the steam manifold 1020 may be included in respective fuel systems and steam systems, such as described previously. Accordingly, the fuel manifold 1004 may provide fuel from a fuel supply 1002 and the steam manifold 1020 may provide steam from a steam supply 1018.

Operation of the multi-stage turbine 1000 is substantially the same as described with respect to the turbines of FIGS. 1 to 4. In the multi-stage turbine 1000 having multiple inter-stage combustors, the inter-stage combustors may be in successive stages or non-successive stages of the turbine. In other words, a three-stage turbine may employ inter-stage combustors in stages one, two, and three, or may employ combustors at stages one and three, or may employ inter-stage combustors and an inter-stage combustor steam supply in any other combination as may be advantageous to the size, shape, layout, manufacture, operation, or performance of the engine. This is merely exemplary and other arrangements of inter-stage combustors are contemplated. In some examples, the multi-stage turbine 1000 may employ multiple inter-stage combustors, but may only employ a steam supply for a portion of the inter-stage combustors.

In some examples, a turbine engine may employ both an inter-turbine combustor (e.g., inter-turbine combustor 194 of FIG. 2) and one or more inter-stage combustors (e.g., inter-stage combustors described in FIGS. 3 to 5), as described herein, with steam supply to one or more of the inter-turbine or inter-stage combustors.

Figure 6:
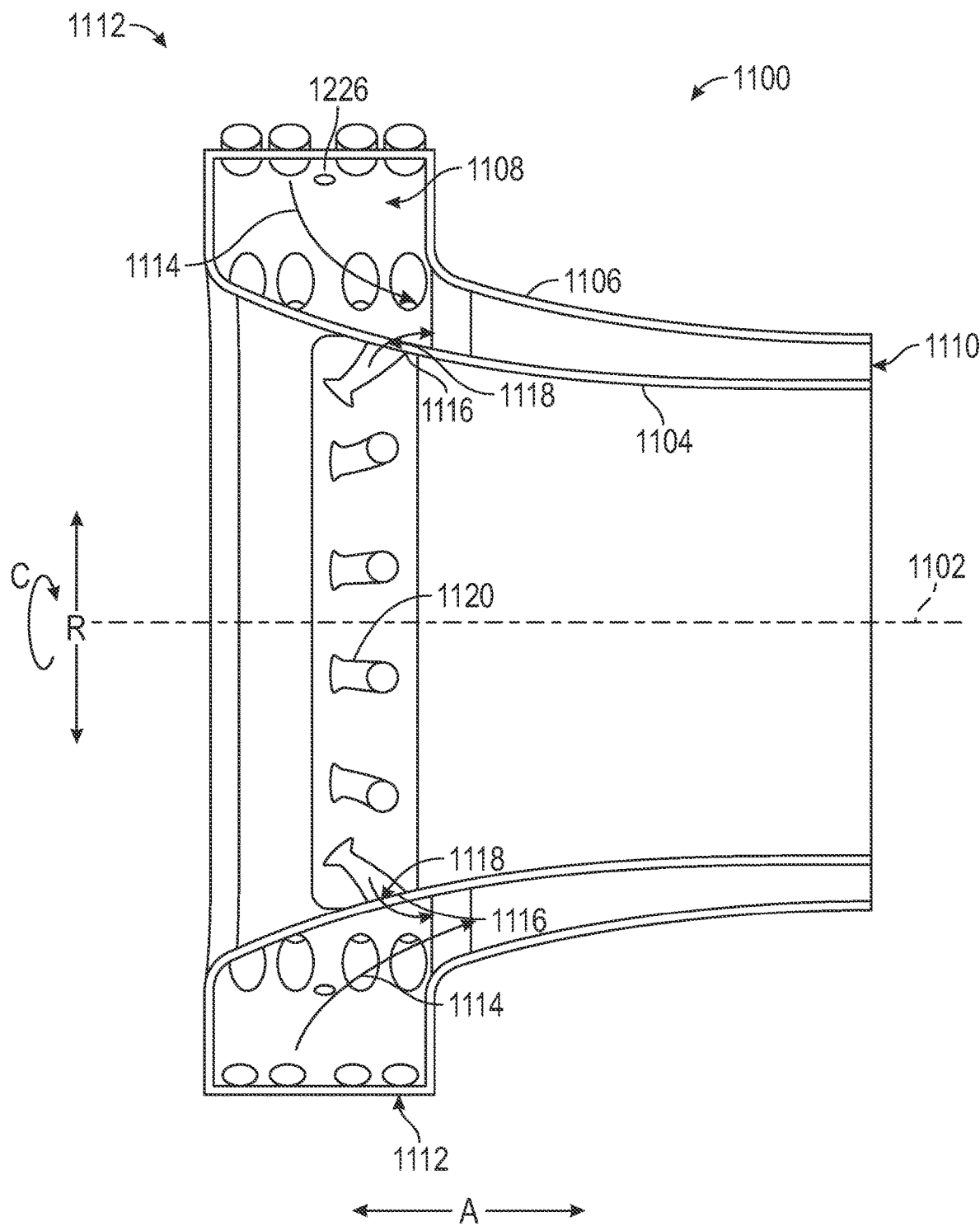
FIG. 6 is a schematic view of a tangential radial inflow combustor, according to an embodiment of the present disclosure.
Figure 7:
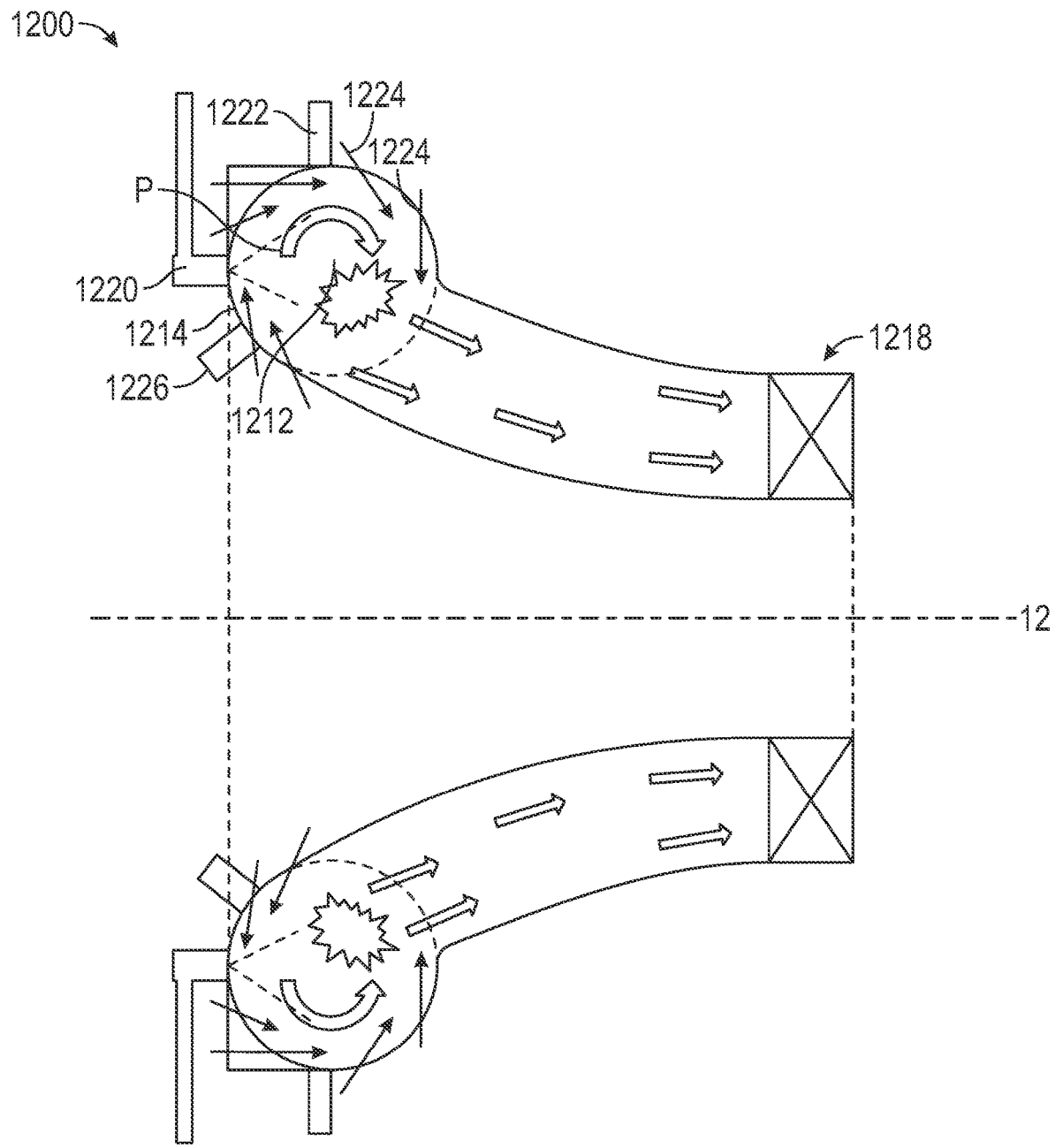
FIG. 7 is a schematic view of a trapped vortex cavity combustor, according to an embodiment of the present disclosure.

FIGS. 6 and 7 illustrate exemplary combustors that may be employed as the primary combustor, one or more of the inter-turbine combustors, one or more of the inter-stage combustors, or combinations thereof, as described with respect to FIGS. 1 to 5.

For example, FIG. 6 illustrates a tangential-radial inflow (TRI) combustor 1100. The TRI combustor 1100 may be a primary combustor, an inter-turbine combustor, or an inter-stage combustor. The TRI combustor 1100 generally defines an axial direction A extending along an axial centerline 1102, a radial direction R, and a circumferential direction C (i.e., a direction extending about the axial direction A). The axial centerline 1102 may align with a centerline of the turbine engine within which the TRI combustor 1100 is installed (e.g., the longitudinal centerline axis 12 of the turbine engine 10 of FIG. 1).

The TRI combustor 1100 includes an inner combustion liner 1104 and an outer combustion liner 1106. The inner combustion liner 1104 and the outer combustion liner 1106 define a combustion chamber 1108 having a combustor outlet 1110. The TRI combustor 1100 includes an inlet assembly 1112 that introduces an airflow 1114, such as compressed air, from a compressor section of the turbine engine (in the case of a primary combustor) or an upstream turbine or an upstream turbine stage (in the case of an inter-turbine combustor or an inter-stage combustor) into the combustion chamber 1108. The inlet assembly 1112 introduces the airflow 1114 in a manner such that the airflow 1114 has a desired swirl.

In addition, the inner combustion liner 1104 includes a plurality of dilution holes 1116 to provide a dilution airflow 1118 to the combustion chamber 1108. The exemplary dilution holes 1116 are configured such that dilution airflow 1118 discharged therefrom flows helically relative to the axial centerline 1102 of the TRI combustor 1100, such that an angular momentum of the airflow 1114 is maintained when dilution airflow 1118 mixes with the airflow 1114. Each dilution hole 1116 may include a chute 1120 to facilitate channeling airflow from a source (not shown) through dilution holes 1116.

As described above, an embodiment of the primary combustor, the inter-turbine combustor, or the inter-stage combustor described herein relates to a TRI combustor 1100. In the TRI combustor 1100, the inner combustion liner 1104 and the outer combustion liner 1106 are convex relative to the axial centerline 1102 of the TRI combustor 1100 such that combustion chamber 1108 is defined at a radially outermost region of the TRI combustor 1100. To facilitate inducing bulk swirl in the airflow 1114, the inlet assemblies 1112 are oriented to discharge the airflow 1114 circumferentially and radially into combustion chamber 1108.

One or more of the inlet assemblies 1112 may introduce steam from the steam supply, fuel from the fuel supply, or both, as previously described herein. Additionally or alternatively, the steam supply or the fuel supply may be introduced at other locations along the length of the TRI combustor 1100, upstream of the TRI combustor 1100, downstream of the TRI combustor 1100, or any combination thereof.

FIG. 7 illustrates schematic view of an exemplary trapped vortex (TV) combustor 1200 that may be used in a gas turbine engine. For example, the exemplary TV combustor 1200 of FIG. 7 may be configured in a similar manner as any combustor, any combination of the combustors, or all combustors described here, such as, the primary combustor 26 incorporated in the turbine engine 10 of FIG. 1, the primary combustor 26 or the inter-turbine combustor 194 incorporated in the turbine engine 100 of FIG. 2, the primary combustor 26, the HPT inter-stage combustor 596, or the LPT inter-stage combustor 598 incorporated in the turbine engine 500 of FIGS. 3 and 4, or the first inter-stage combustor 1012, the second inter-stage combustor 1014, or the third inter-stage combustor 1016 incorporated in the multi-stage turbine 1000 of FIG. 5.

FIG. 7 shows the TV combustor 1200, and the combustor may be included within a gas turbine engine disclosed herein. The TV combustor 1200 comprises a TV combustion zone 1212, and a combustor exit 1218.

In order to simplify the illustration and the description, only the upper half portion of the TV combustor 1200 in FIG. 7 is indicated by reference numbers and described specifically. Accordingly, the opposite lower half portion could be understood totally by reference to the illustration and the description of the upper half portion, since the TV combustor 1200 is substantially symmetrical about a longitudinal centerline axis 12 of the gas turbine.

Alternatively, the TV combustor as employed in an inter-turbine combustor or an inter-stage combustor, may be single sided. That is, the combustor may not be fully annular, but may instead be an annular section.

The TV combustor 1200 comprises an annular combustor that is shaped as generally annular about the longitudinal centerline axis 12 of the gas turbine, such that the TV combustion zone 1212 may be shaped as annular. The TV combustion zone 1212 may be formed or shaped as a trapped vortex (TV) combustion cavity in various embodiments. A combustor casing (not shown) may be positioned around the combustor for providing support or protection, and the like.

As illustrated in FIG. 7, the upper half portion and the lower half portion of the TV combustion zone 1212 each comprises a side wall 1214, at least one pilot fuel nozzle 1220 disposed on one side end (forward end) of the side wall 1214, and an igniter 1222 disposed on a radially outward end of the side wall 1214 for igniting. A plurality of pilot fuel nozzles 1220 may be disposed symmetrically about the longitudinal centerline axis 12, such as being disposed circumferentially surrounding the longitudinal centerline axis 12.

As described above, the TV combustion zone 1212 may have a substantially circular longitudinal cross-sectional shape depicted in FIGS. 1 to 3. In other exemplary embodiments, the TV combustion zone may be configured as substantially arcuate in longitudinal cross section or substantially rectangular in longitudinal cross section.

The one or more pilot fuel nozzles 1220 are operable to inject a fuel (or reactant) into the TV combustion zone 1212. The pilot fuel nozzle(s) 1220 may be air-blast nozzle(s), pressure atomizer nozzle(s), plain jet orifice nozzle(s), or any other kinds of nozzles that one skilled in the art could conceive. The fuel comprises a liquid fuel, a gaseous fuel, or a combination of these, which can be selected from the usual fuels, such as jet fuel and any other kinds of fuel that any person skilled in the art could conceive. Air 1224 is compressed air from a compressor (not shown) disposed upstream of the TV combustor 1200, and the air 1224 is directed into the TV combustion zone 1212 via a plurality of air apertures (not shown) formed through the side wall 1214 along a periphery of the TV combustion zone 1212 and flows toroidally and enhances the mixing effect with the fuel.

The fuel and the air 1224 are received and mixed in the TV combustion zone 1212. The igniter 1222 initiates combustion by a spark to produce combustion products P flowing toroidally therein.

The steam supply may be introduced into the TV combustor 1200 through one or more steam inlets 1226. Additionally or alternatively, the steam supply may be combined with air and fuel upstream or downstream of the TV combustor 1200.

Although not shown, further embodiments of the TV combustor 1200 may include a secondary, tertiary, or more combustion zones disposed downstream of the TV combustion zone 1212.

A turbine engine with multiple combustors such as primary, inter-turbine, and inter-stage combustors may employ TRI combustors, TV combustors, or a combination of TRI combustors and TV combustors in any combination as may be advantageous to the size, shape, layout, manufacture, operation, or performance of the engine. Further, the turbine engine may include combustor types not herein contemplated, as may be so advantageous.

Introducing steam into various locations of a turbine engine as described herein, may occur at locations within, adjacent to, or separate from the high-temperature locations of the turbine engine, as may be advantageous to the size, the shape, the layout, the manufacture, the operation, or the performance of the engine. For example, the steam may be introduced to a core air flow path upstream or downstream of a combustor, or the steam may be injected through passages in the stator vanes of a turbine. When so introduced, at locations adjacent to or separate from the high-temperature location, the steam injection may raise the temperature at the point of injection, while still serving to lower the temperature in a more critical high-temperature location of the turbine engine.

Turbine engines see higher maximum internal temperatures as a consequence of designs intended to reduce fuel consumption and $CO_2$ emission. The higher internal temperatures result in the emission of other pollutants, including nitrogen oxides emissions ($NO_x$ emissions), known to cause damage to the atmosphere, and believed to contribute to global warming and/or climate change. By introducing steam in conjunction with secondary inter-turbine or inter-stage combustors (ITB's) in a turbine engine with high internal pressures and temperatures, harmful emissions may be reduced, and thrust may be increased relative to a similar capacity turbine engine with a single combustor, or without steam at the one or more ITB's.

The foregoing description describes a fuel-lean burn condition, where all fuel is consumed at the respective combustors, leaving unconsumed air in combustion products to be mixed with fuel and further combusted downstream. Further embodiments are contemplated with a similar function, but with a fuel-rich burn condition. In a fuel-rich burn condition, the foregoing fuel systems as described are substituted with analogous air systems.

Further aspects of the present disclosure are provided by the subject matter of the following clauses.

A turbine engine comprises a compressor section that provides a compressed air flow, a fuel system that provides a fuel to a primary combustor fuel supply and a secondary combustor fuel supply, a primary combustor located downstream of the compressor section, the primary combustor receiving the compressed air flow and the primary combustor fuel supply, and combusting the compressed air flow and the primary combustor fuel supply to generate primary combustion products, a turbine section located downstream of the primary combustor, the turbine section comprises a turbine that is caused to rotate by the primary combustion products, and a secondary combustor that combusts a mixture of the primary combustion products and the secondary combustor fuel supply to generate secondary combustion products, and a steam system comprises a steam supply to the secondary combustor to increase total mass flow in the turbine section.

The turbine engine of the preceding clause, wherein the turbine is a first turbine, the turbine section further comprises a second turbine, wherein the secondary combustor is an inter-turbine combustor located between the first turbine and the second turbine, the secondary combustor fuel supply is an inter-turbine combustor fuel supply, the steam supply is an inter-turbine combustor steam supply, and the secondary combustion products are inter-turbine combustion products, and the inter-turbine combustion products and the inter-turbine combustor steam supply rotate the second turbine.

The turbine engine of any preceding clause, wherein the steam supply is a secondary combustor steam supply and the steam system further comprises a primary combustor steam supply that provides steam to the primary combustor.

The turbine engine of the preceding clause, wherein the fuel system further comprises a fuel manifold that apportions a flow of fuel to the primary combustor fuel supply and to the secondary combustor fuel supply, the steam system further comprises a steam manifold that apportions a flow of steam to the primary combustor steam supply and to the secondary combustor steam supply, and the turbine engine further comprises a controller that receives a primary combustor data signal indicating a state of the primary combustor and a secondary combustor data signal indicating a state of the secondary combustor, processes the primary combustor data signal and the secondary combustor data signal, and generates a fuel manifold control signal that controls the fuel manifold and a steam manifold control signal that controls the steam manifold.

The turbine engine of the preceding clause, wherein the primary combustor data signal or the secondary combustor data signal indicates at least one of a temperature, a pressure, or a mass flow rate.

The turbine engine of any preceding clause, wherein the secondary combustor fuel supply is an inter-stage combustor fuel supply, the steam supply is an inter-stage combustor steam supply, the turbine is a multi-stage turbine, and the secondary combustor is an inter-stage combustor located between adjacent stages such that the secondary combustion products are inter-stage combustion products, and the inter-stage combustion products and the inter-stage combustor steam supply rotate the multi-stage turbine.

The turbine engine of the preceding clause, wherein the multi-stage turbine is a first multi-stage turbine, and the inter-stage combustion products are first inter-stage combustion products, and the turbine section further comprises a second multi-stage turbine that includes a second inter-stage combustor between adjacent stages of the second multi-stage turbine that combusts the first inter-stage combustion products and a second inter-stage combustor fuel supply, to produce second inter-stage combustion products.

The turbine engine of any preceding clause, wherein the inter-stage combustor is a first inter-stage combustor, the inter-stage combustor fuel supply is a first inter-stage combustor fuel supply, the inter-stage combustor steam supply is a first inter-stage combustor steam supply, and the inter-stage combustion products are first inter-stage combustion products, the multi-stage turbine comprising a second inter-stage combustor between adjacent stages, the fuel system comprising a second inter-stage combustor fuel supply providing fuel to the second inter-stage combustor, and the steam system comprising a second inter-stage combustor steam supply providing steam to the second inter-stage combustor to increase total mass flow in the turbine section, wherein the second inter-stage combustor further combusts the first inter-stage combustion products and the second inter-stage combustor fuel supply, generating second inter-stage combustion products.

The turbine engine of any preceding clause, wherein the turbine section comprises a second turbine, and an inter-turbine combustor located between the multi-stage turbine and the second turbine, wherein the fuel system comprises an inter-turbine combustor fuel supply providing fuel to the inter-turbine combustor, the steam system comprises an inter-turbine combustor steam supply that provides steam to the inter-turbine combustor, and the inter-turbine combustor further combusts the inter-stage combustion products and the inter-turbine combustor fuel supply to produce inter-turbine combustion products.

A method of operating the turbine engine of any preceding clause, the method comprising apportioning a fuel flow to the primary combustor fuel supply, apportioning a fuel flow to the secondary combustor fuel supply, and apportioning a steam flow to the steam supply, wherein the apportioning the fuel flow and the apportioning the steam flow are based on at least one of a turbine engine input control parameter, a primary combustor data signal, or a secondary combustor data signal.

The method of the preceding clause, wherein the primary combustor data signal or the secondary combustor data signal indicates at least one of a temperature, a pressure, or a mass flow rate.

The method of any preceding clause, wherein, in an excess steam condition, the method discharges steam from the turbine engine.

The method of any preceding clause, wherein the steam supply is a secondary combustor steam supply, the steam system further comprises a primary combustor steam supply providing steam to the primary combustor, and the method further comprises apportioning the steam flow to the primary combustor steam supply.

The method of the preceding clause, wherein during a high power condition, the method increases the steam flow to the primary combustor steam supply, the steam flow to the secondary combustor steam supply, or both the steam flow to the primary combustor steam supply and the steam flow to the secondary combustor steam supply.

The method of any preceding clause, further comprising apportioning the primary combustor steam supply, the secondary combustor steam supply, the primary combustor fuel supply, and the secondary combustor fuel supply to reduce fuel consumption for a given turbine engine input control parameter.

The method of any preceding clause, further comprising controlling the primary combustor steam supply or the secondary combustor steam supply to prevent blowout.

The method of any preceding clause, further comprising apportioning the primary combustor steam supply, the secondary combustor steam supply, the primary combustor fuel supply, and the secondary combustor fuel supply to reduce contrail generation.

The method of any preceding clause, further comprising apportioning the primary combustor steam supply, the secondary combustor steam supply, the primary combustor fuel supply, and the secondary combustor fuel supply to reduce $NO_x$ emission.

The method of any preceding clause, wherein, upon the primary combustor data signal or the secondary combustor data signal reaching a predetermined threshold value, the method further comprises increasing the primary combustor steam supply, the secondary combustor steam supply, or both the primary combustor steam supply and the secondary combustor steam supply.

The method of the preceding clause, wherein, in a limited steam condition, the method further comprises decreasing the primary combustor fuel supply, the secondary combustor fuel supply, or both the primary combustor fuel supply and the secondary combustor fuel supply.

The turbine engine of any preceding clause, further comprising a core turbine engine casing containing a core air supply, wherein the secondary combustor steam supply is fluidly coupled to the core turbine engine casing, introducing steam to the core air, upstream of the secondary combustor.

The turbine engine of any preceding clause, wherein the secondary combustor steam supply is fluidly coupled to the secondary combustor.

The turbine engine of any preceding clause, wherein the secondary combustor steam supply and the secondary combustor fuel supply are fluidly coupled to a secondary combustor fuel and steam supply, which is fluidly coupled to the secondary combustor.

The turbine engine of any preceding clause, the turbine section further comprising at least one stator vane, and at least one passage in the at least one stator vane, wherein the secondary combustor steam supply is introduced through the at least one passage in the at least one stator vane.

The turbine engine of any preceding clause, wherein at least one of the primary combustor or the secondary combustor is a tangential-radial inflow combustor.

The turbine engine of any preceding clause, wherein at least one of the primary combustor or secondary combustor is a trapped vortex combustor.

A method of operating the turbine engine of any preceding clause, the method comprising apportioning the primary combustor fuel supply and the secondary combustor fuel supply and apportioning the primary combustor steam supply and the secondary combustor steam supply, based on a turbine engine input control parameter, a primary combustor data signal, and a secondary combustor data signal.

The turbine engine of any preceding clause, wherein the fuel system further comprises a fuel manifold that apportions a flow of fuel to the primary combustor fuel supply and to the secondary combustor fuel supply, the steam system further comprises a steam manifold that apportions the flow of steam to the secondary combustor, and the turbine engine further comprises a control system generating a primary combustor data signal that communicates a signal of a state of the primary combustor, a secondary combustor data signal that communicates a signal of a state of the secondary combustor, a fuel manifold control signal that controls the fuel manifold, a steam manifold control signal that controls the steam manifold, and a controller that determines and generates the fuel manifold control signal and the steam manifold control signal.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine comprising:
   a compressor section including an HP compressor and an LP compressor, the compressor section providing a compressed air flow;
   a fuel system that provides fuel to a primary combustor fuel supply and a secondary combustor fuel supply;
   a primary combustor located downstream of the compressor section, the primary combustor receiving the compressed air flow and the primary combustor fuel supply, and combusting the compressed air flow and the primary combustor fuel supply to generate primary combustion products;
   a turbine section located downstream of the primary combustor, the turbine section comprising:
      an HP turbine mechanically connected to the HP compressor via an HP shaft, the HP turbine rotating from a flow of the primary combustion products;
      an LP turbine mechanically connected to the LP compressor via an LP shaft, the LP turbine positioned downstream of the HP turbine; and
      a secondary combustor, positioned between the HP turbine and the LP turbine, that combusts a mixture of the primary combustion products and the secondary combustor fuel supply to generate secondary combustion products; and
   a steam system comprising a steam supply to supply steam to the secondary combustor to increase total mass flow in the turbine section.

2. The turbine engine of claim 1, wherein the steam supply is a secondary combustor steam supply and the steam system further comprises a primary combustor steam supply that provides steam to the primary combustor.

3. The turbine engine of claim 2, wherein the fuel system further comprises a fuel manifold that apportions a flow of fuel to the primary combustor fuel supply and to the secondary combustor fuel supply,
the steam system further comprises a steam manifold that apportions a flow of steam to the primary combustor steam supply and to the secondary combustor steam supply, and
the turbine engine further comprises a controller that receives a primary combustor data signal indicating a state of the primary combustor and a secondary combustor data signal indicating a state of the secondary combustor, processes the primary combustor data signal and the secondary combustor data signal, and generates a fuel manifold control signal that controls the fuel manifold and a steam manifold control signal that controls the steam manifold.

4. The turbine engine of claim 3, wherein the primary combustor data signal or the secondary combustor data signal indicates at least one of a temperature, a pressure, or a mass flow rate.

5. A method of operating the turbine engine of claim 1, the method comprising:
apportioning a fuel flow to the primary combustor fuel supply;
apportioning a fuel flow to the secondary combustor fuel supply; and
apportioning a steam flow to the steam supply,
wherein the apportioning the fuel flow and the apportioning the steam flow are based on at least one of a turbine engine input control parameter, a primary combustor data signal, or a secondary combustor data signal.

6. The method of claim 5, wherein the primary combustor data signal or the secondary combustor data signal indicates at least one of a temperature, a pressure, or a mass flow rate.

7. The method of claim 5, wherein, in an excess steam condition, the method discharges steam from the turbine engine.

8. The method of claim 5, wherein the steam supply is a secondary combustor steam supply, the steam system further comprises a primary combustor steam supply providing steam to the primary combustor, and the method further comprises apportioning the steam flow to the primary combustor steam supply.

9. The method of claim 8, wherein, during a high power condition, the method increases the steam flow to the primary combustor steam supply, the steam flow to the secondary combustor steam supply, or both.

10. The method of claim 8, further comprising apportioning the primary combustor steam supply, the secondary combustor steam supply, the primary combustor fuel supply, and the secondary combustor fuel supply to reduce fuel consumption for a given turbine engine input control parameter.

11. The method of claim 8, further comprising controlling the primary combustor steam supply or the secondary combustor steam supply to prevent blowout.

12. The method of claim 8, further comprising apportioning the primary combustor steam supply, the secondary combustor steam supply, the primary combustor fuel supply, and the secondary combustor fuel supply to reduce contrail generation.

13. The method of claim 8, further comprising apportioning the primary combustor steam supply, the secondary combustor steam supply, the primary combustor fuel supply, and the secondary combustor fuel supply to reduce $NO_x$ emission.

14. The method of claim 8, wherein, upon the primary combustor data signal or the secondary combustor data signal reaching a predetermined threshold value, the method further comprises increasing the primary combustor steam supply or the secondary combustor steam supply.

15. The method of claim 14, wherein, in a limited steam condition, the method further comprises decreasing the primary combustor fuel supply or the secondary combustor fuel supply.

16. A turbine engine comprising:
a compressor section that provides a compressed air flow;
a fuel system that provides fuel to a primary combustor fuel supply and an inter-stage combustor fuel supply;
a primary combustor located downstream of the compressor section, the primary combustor receiving the compressed air flow and the primary combustor fuel supply, and combusting the compressed air flow and the primary combustor fuel supply to generate primary combustion products;
a turbine section located downstream of the primary combustor, the turbine section comprising:
an HP turbine connected to an HP shaft and rotating from a flow of the primary combustion products, the HP turbine being a multi-stage turbine;
an LP turbine connected to an LP shaft and positioned downstream of the HP turbine; and
a secondary combustor that combusts a mixture of the primary combustion products and fuel from the inter-stage combustor fuel supply to generate inter-stage combustion products, the secondary combustor being an inter-stage combustor located between adjacent stages of the HP turbine such that the inter-stage combustion products of the secondary combustor are HP inter-stage combustion products; and
a steam system comprising an inter-stage combustor steam supply to supply steam to the secondary combustor to increase total mass flow in the turbine section,
wherein the HP inter-stage combustion products and the inter-stage combustor steam supply rotate the HP turbine.

17. The turbine engine of claim 16, wherein the inter-stage combustor fuel supply includes an HP inter-stage combustor fuel supply and an LP inter-stage combustor fuel supply, and the LP turbine includes adjacent stages and a tertiary combustor between the adjacent stages, the tertiary combustor combusting the HP inter-stage combustion products and the fuel from the LP inter-stage combustor fuel supply, to produce LP inter-stage combustion products.

18. The turbine engine of claim 16, further comprising an inter-turbine combustor fuel supply, wherein the turbine section further comprises an inter-turbine combustor positioned between the HP turbine and the LP turbine and receiving fuel from the inter-turbine combustor fuel supply, and wherein the steam system further comprises an inter-turbine combustor steam supply that provides steam to the inter-turbine combustor, and the inter-turbine combustor further combusts the HP inter-stage combustion products and the inter-turbine combustor fuel supply to produce inter-turbine combustion products.

19. A method of operating the turbine engine of claim 16, the method comprising:

apportioning a fuel flow to the primary combustor fuel supply;

apportioning a fuel flow to the inter-stage combustor fuel supply; and apportioning a steam flow to the inter-stage combustor steam supply, wherein the apportioning the fuel flow and the apportioning the steam flow are based on at least one of a turbine engine input control parameter, a primary combustor data signal, or a secondary combustor data signal.

20. The method of claim 19, wherein the primary combustor data signal or the secondary combustor data signal indicates at least one of a temperature, a pressure, or a mass flow rate.

* * * * *